US010218826B2

(12) United States Patent
Eswaran et al.

(10) Patent No.: US 10,218,826 B2
(45) Date of Patent: *Feb. 26, 2019

(54) SCALABLE, LIVE TRANSCODING WITH SUPPORT FOR ADAPTIVE STREAMING AND FAILOVER

(71) Applicant: GOOGLE LLC, Mountain View, CA (US)

(72) Inventors: Krishnan Eswaran, Oakland, CA (US); Thierry Foucu, San Jose, CA (US); Jie Sun, Pleasanton, CA (US); Krishna Kumar Gadepalli, Fremont, CA (US); Vijnan Shastri, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,312

(22) Filed: Nov. 13, 2017

(65) Prior Publication Data

US 2018/0069950 A1 Mar. 8, 2018

Related U.S. Application Data

(63) Continuation of application No. 14/971,997, filed on Dec. 16, 2015, now Pat. No. 9,843,656, which is a (Continued)

(51) Int. Cl.
*H04B 7/00* (2006.01)
*H04L 29/14* (2006.01)
(Continued)

(52) U.S. Cl.
CPC ........ *H04L 69/40* (2013.01); *H04L 29/06523* (2013.01); *H04L 65/4015* (2013.01);
(Continued)

(58) Field of Classification Search
CPC ... H04L 69/40; H04L 65/4015; H04L 65/607; H04L 29/06523; H04L 67/2804;
(Continued)

(56) References Cited

U.S. PATENT DOCUMENTS

2002/0198888 A1* 12/2002 Young .................. G06F 9/4881
2005/0251040 A1* 11/2005 Relkuntwar ........... H04L 67/12
600/437

(Continued)

*Primary Examiner* — Sathyanaraya V Perungavoor
*Assistant Examiner* — Howard D Brown, Jr.
(74) *Attorney, Agent, or Firm* — Young Basile Hanlon & MacFarlane, P.C.

(57) ABSTRACT

A method includes separating, using a separation component, a plurality of input streams into a plurality of audio streams having different bitrates and a plurality of video streams having different bitrates; transcoding, using an audio transcoder, the plurality of audio streams into a plurality of transcoded audio streams having different transcode qualities; transcoding, using a video transcoder, the plurality of video streams into a plurality of transcoded video streams having different transcode qualities; segmenting, using a segmentation component, the plurality of audio streams into a plurality of equivalent audio segments based on identified segment boundaries associated with the plurality transcoded audio streams and the plurality of video streams into a plurality of equivalent video segments based on identified segment boundaries associated with the plurality of transcoded video streams; and joining, using a conjoining component, the plurality of equivalent audio segments and the plurality of video segments into a single stream.

20 Claims, 10 Drawing Sheets

Related U.S. Application Data continuation of application No. 13/444,787, filed on Apr. 11, 2012, now Pat. No. 9,246,741.

(51) Int. Cl.
*H04L 29/06* (2006.01)
*H04N 21/231* (2011.01)
*H04N 21/2343* (2011.01)
*H04N 21/845* (2011.01)
*H04L 29/08* (2006.01)

(52) U.S. Cl.
CPC .......... *H04L 65/602* (2013.01); *H04L 65/607* (2013.01); *H04L 67/2804* (2013.01); *H04N 21/2343* (2013.01); *H04N 21/23106* (2013.01); *H04N 21/234309* (2013.01); *H04N 21/8456* (2013.01)

(58) Field of Classification Search
CPC .............. H04L 65/602; H04N 21/8456; H04N 21/234309; H04N 21/2343; H04N 21/23106
See application file for complete search history.

(56) References Cited

U.S. PATENT DOCUMENTS

| | | | |
|---|---|---|---|
| 2010/0004014 A1* | 1/2010 | Coulombe | H04W 88/181 455/519 |
| 2010/0008421 A1* | 1/2010 | Gutman | H04N 21/234309 375/240.16 |
| 2013/0272374 A1* | 10/2013 | Eswaran | H04L 65/602 375/240.02 |
| 2016/0323351 A1* | 11/2016 | Luthra | G06F 17/30233 |
| 2017/0344439 A1* | 11/2017 | Howe | G06F 11/1471 |

* cited by examiner

US 10,218,826 B2

SCALABLE, LIVE TRANSCODING WITH SUPPORT FOR ADAPTIVE STREAMING AND FAILOVER

CROSS REFERENCE TO RELATED APPLICATION

The present application is a continuation of U.S. patent application Ser. No. 14/971,997, filed on Dec. 16, 2015, which is a continuation of U.S. patent application Ser. No. 13/44,787, filed on Apr. 11, 2012, each of which are incorporated herein by reference in their entireties.

TECHNICAL FIELD

This disclosure relates generally to robust, scalable live streaming, and specifically to dynamically generate consistent output streams regardless of the point in which streams join a processing pipeline or of intermittent corruptions in redundant streams.

SUMMARY

Live streaming current events over the Internet increases the demand for a reliable streaming infrastructure. Live streaming feeds are commonly used in such circumstances as major political speeches and events, sporting events, and other cultural happenings in which a large viewing audience is relying on the live streaming feed to be functioning properly. However, due to the distributed nature of any processing and delivery system of this scale, component failure is unavoidable and can interrupt or otherwise affect the quality of the output stream Mission-critical live streaming on the web is done today by building redundancy by having separate hardware and/or software encoders pushing roughly equivalent streams to be redundantly encoded. This encoding takes place in completely separate encoding pathways that produce separate primary and secondary streams. Failovers, which are automatic switches to redundant streams, attempt to minimize disruptions but since they use discrete and/or diverse components, glitch free failovers are generally unattainable.

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to processing adaptive bitrate streaming with different transcode qualities by generating equivalent segments of audio and/or video data. An example of a method includes separating, using a separation component, a plurality of input streams into a plurality of audio streams having different bitrates and a plurality of video streams having different bitrates; transcoding, using an audio transcoder, the plurality of audio streams into a plurality of transcoded audio streams having different transcode qualities; transcoding, using a video transcoder, the plurality of video streams into a plurality of transcoded video streams having different transcode qualities; segmenting, using a segmentation component, the plurality of audio streams into a plurality of equivalent audio segments based on identified segment boundaries associated with the plurality transcoded audio streams and the plurality of video streams into a plurality of equivalent video segments based on identified segment boundaries associated with the plurality of transcoded video streams; and joining, using a conjoining component, the plurality of equivalent audio segments and the plurality of video segments into a single stream.

Also disclosed herein is a system including a processor for executing instructions; and a non-transitory computer readable medium storing instructions executable to perform steps comprising: separating a plurality of input streams into a plurality of audio streams having different bitrates and a plurality of video streams having different bitrates; transcoding the plurality of audio streams into a plurality of transcoded audio streams having different transcode qualities; transcoding the plurality of video streams into a plurality of transcoded video streams having different transcode qualities; segmenting the plurality of audio streams into a plurality of equivalent audio segments based on identified segment boundaries associated with the plurality transcoded audio streams and the plurality of video streams into a plurality of equivalent video segments based on identified segment boundaries associated with the plurality of transcoded video streams; and joining the plurality of equivalent audio segments and the plurality of video segments into a single stream.

Further disclosed herein is A non-transitory computer readable storage medium comprising computer executable instructions that, in response to execution, cause a processor to perform operations comprising: identifying a plurality of segment boundaries within an interval of input streams of a plurality of input streams; separating the plurality of input streams into a plurality of audio streams having different bitrates and a plurality of video streams having different bitrates; transcoding the plurality of audio streams into a plurality of transcoded audio streams having different transcode qualities; transcoding the plurality of video streams into a plurality of transcoded video streams having different transcode qualities; segmenting the plurality of audio streams into a plurality of equivalent audio segments based on identified segment boundaries associated with the plurality transcoded audio streams and the plurality of video streams into a plurality of equivalent video segments based on identified segment boundaries associated with the plurality of transcoded video streams; and joining the plurality of equivalent audio segments and the plurality of video segments into a single stream.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION OF THE EMBODIMENTS

Figure 1:
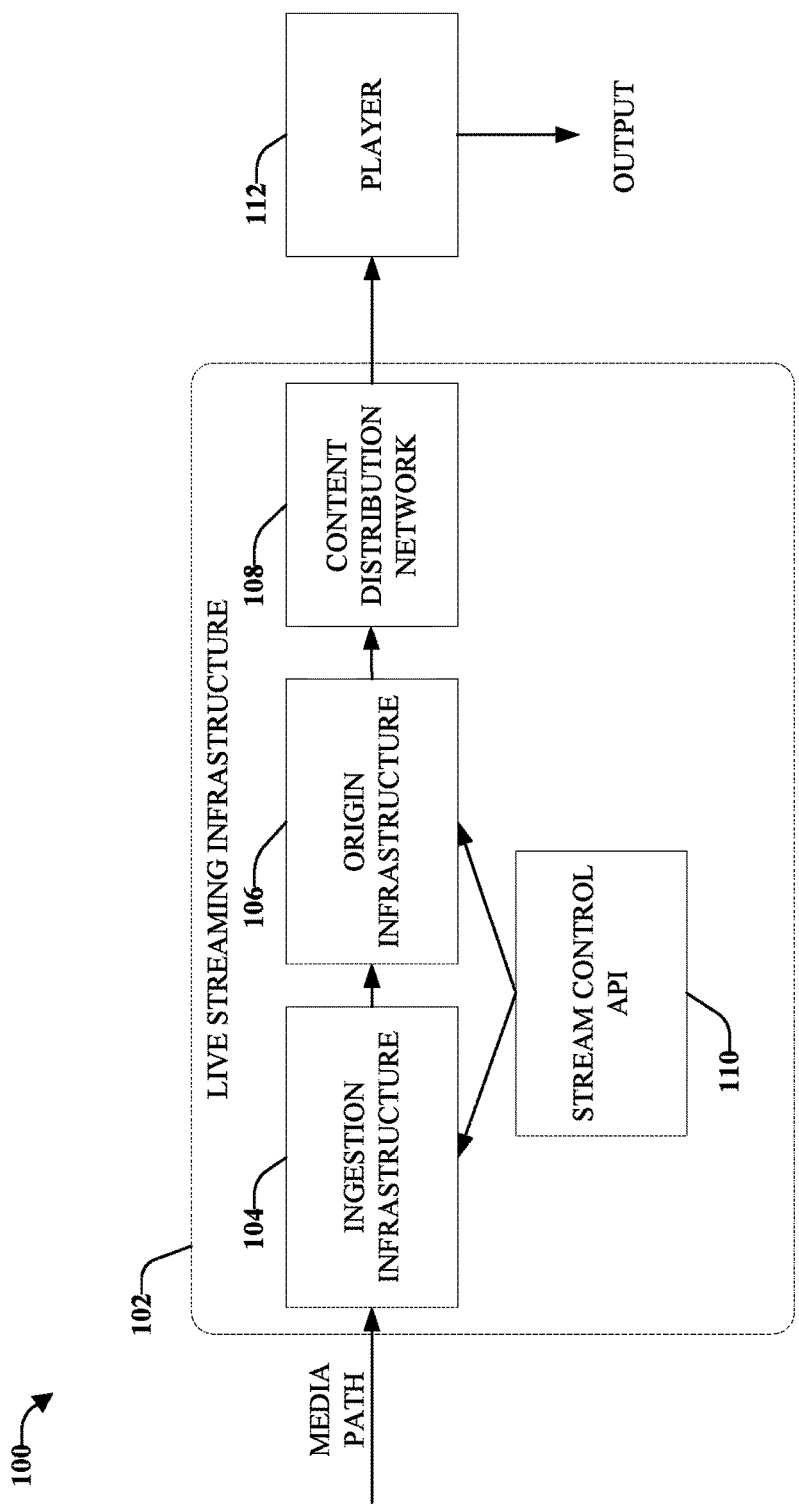
FIG. 1 is a block diagram illustrating an example, non-limiting embodiment of a live streaming infrastructure in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-out of providing personal information, demographic information, location information, proprietary information, sensitive information, or the like in connection with data gathering aspects.

Moreover, one or more implementations described herein can provide for anonymizing collected, received, or transmitted data.

Live streaming input streams can be coherently processed in redundant live transcoding pipelines to better handle failover events and adaptive bitrate streaming. For live transcoding, redundant transcoders can be provided in case of failures as well as to support different transcoding qualities, such as multiple resolutions/bitrates, in which multiple live transcoder pipelines operate in parallel to one another. When publishing the live video streams that are transcoded, the different transcoded streams are aligned at regular intervals, which can enable switching between streams, either to adapt the bitrate or due to the failure of the pipeline, and provide a seamless experience for user viewing. However, often different parts of a video stream processing pipeline fail and have to rejoin the video stream at arbitrary points in time. In order to further manage adaptive bitrate streaming, different transcode qualities have to be accounted for and processed, in which the different transcode qualities of the system are generated with equivalent segments of audio and/or video data.

In an embodiment, the live streaming platform can operate entirely within the 'cloud' environment, and thus the system can be provided invisibly to the end-user. Providing the live streaming platform in the cloud environment means that the ingestion infrastructures can be servers that receive the incoming multicast live streams, process the live streams, and deliver a robust and stable stream to various players, also based on servers that deliver the live stream to the end-user. The end-user can access the live stream via a web browser or lightweight application.

Coherent streams can be created from multiple ingestion paths and upon a failure of any part of one of the streams, a whole, single stream can be reconstructed from the coherent streams.

Replicas of input streams can be processed in parallel ingestion pipelines and the input streams can be transcoded into desired output streams (at different bitrates) while preserving time information of the streams (timestamps). The streams can be coherently segmented using a segmentation function that identifies segment boundaries based on a bitmasking/modulo N stream joining and chunking of the inputs streams, where N is the target length for a chunk. This can be accomplished, for example, by initializing the segmentation process at a common key frame across all the sub-streams, resulting in identically segmented redundant input streams.

In another embodiment, a chunk transcoding system generates equivalent segments regardless of where two streams joins, or regardless of the time in which streams join. A segment identification component identifies segment boundaries within an interval of input streams for a plurality of transcoding pipelines, and a segmentation component that segments the input streams into equivalent chunks based on the segment boundaries identified, wherein the input streams include different transcode qualities. A conjoining component that combines the input streams, the input streams including an audio stream and a video stream, from the plurality of transcoding pipelines into a single stream having the equivalent chunks.

The term equivalent chunks includes the term equivalent segments that is defined as small portions of a transcoded video of roughly the same length that correspond to the same source of audio and/or video data. For example, a same length can be a same duration or length of time.

Referring now to the drawings, FIG. 1 illustrates a block diagram of an example live streaming system 100 in accordance with various aspects and implementations is shown. Live streaming infrastructure 102 can be provided to ingest and/or process live media feeds and distribute them to media players 112. Media players 112 can interpret the video signals and display the output using the native media stack of each of the target platforms. Players 112 can also include integrated monetization modules.

The live streaming infrastructure 102 can include ingestion infrastructure 104, origin infrastructure 106, content distribution network 108, and a stream/event control application programming interface ("API") 110. Ingestion infrastructure 104 can receive incoming media feeds and redundantly process the live feeds in separate pipelines.

Origin infrastructure 106 can save the live media streams to memory, and prepare the live streams for delivery to the content distribution network 108 which delivers the live media stream to the media players 112. The stream control API 110 can give broadcasting partners the ability to start and/or stop an event, configure monetization settings, and in general manage the set of broadcast events and their lifecycle.

Figure 2:
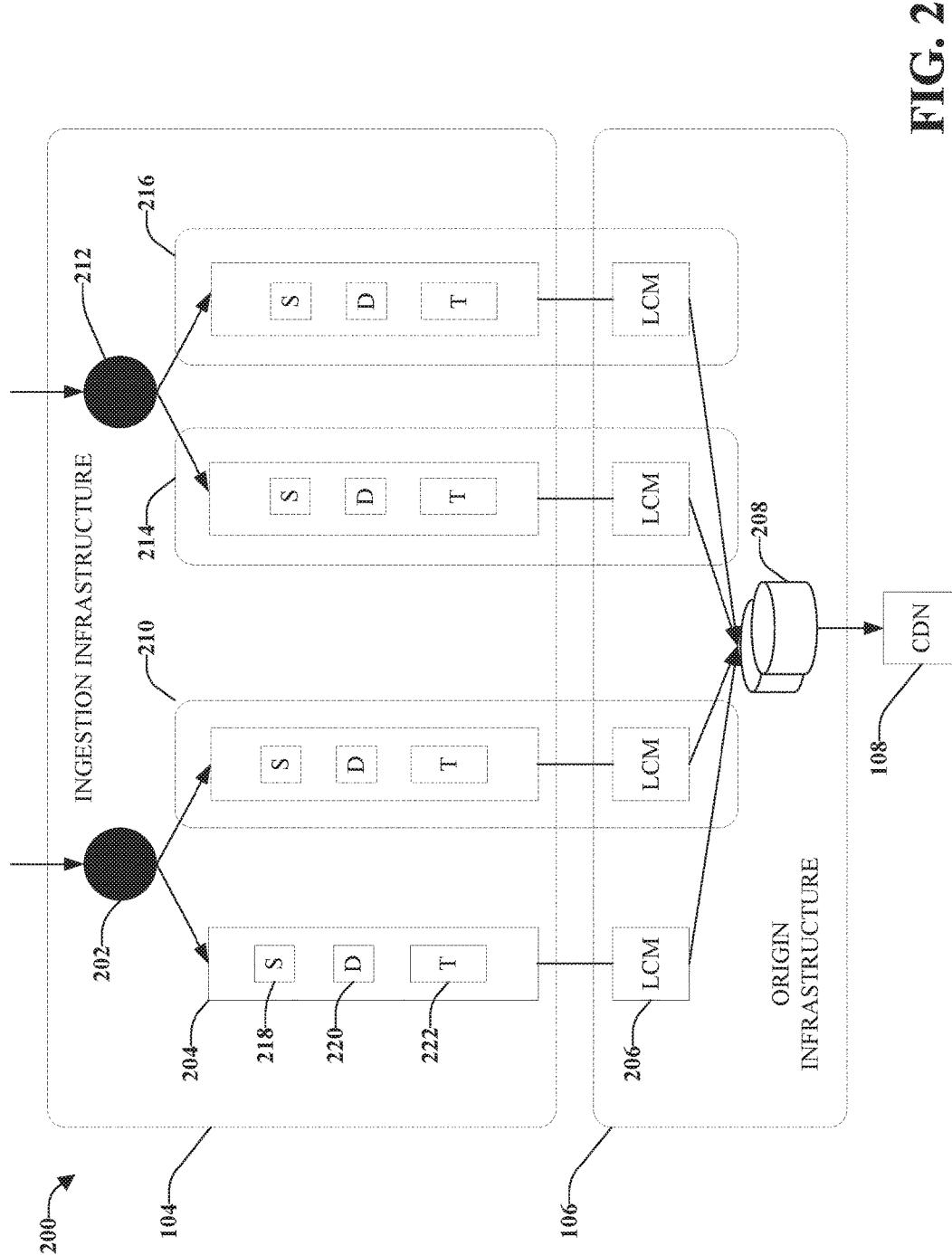
FIG. 2 is a block diagram illustrating an example, non-limiting embodiment of a redundant ingestion system with parallel ingestion pipelines in accordance with various aspects and implementations described herein.

Turning now to FIG. 2, a block diagram illustrating an example, non-limiting embodiment of a redundant ingestion system 200 with parallel ingestion pipelines in accordance with various aspects and implementations is shown. In the ingestion infrastructure 104, redundant live media streams are received at ingestion entry points 202 and 212. Once received, the redundant live media streams are ingested and processed by the parallel pipelines 204, 210, 214, and 216 and eventually saved to a memory 208 in the origin infrastructure 106 by live chunk managers (e.g. 206), before being distributed via a content distribution network 108.

The ingestion entry points 202 and 212 can receive multicast signals acquired through direct peering with the broadcast originator or via real time messaging protocol ("RTMP") signals acquired through a worldwide network of ingestion servers. Ingestion entry points 202 and 212 can also receive input streams from hypertext transfer protocol ("HTTP") based ingestion via resumable POST request and as a pre-segmented stream (independent POST with a session indicator). The ingestion entry points 202 and 212 can also receive the live media streams from other sources commonly used for delivering live media feeds. Once the redundant live media streams are received, parallel ingestion pipelines 204, 210, 214, and 216 can ingest and process the redundant live media streams in parallel. It is to be appreciated that while FIG. 2 depicts pipelines 204 and 210 processing live streams from entry point 202, and pipelines 214 and 216 are processing live streams from entry point 212, there can be any combination of pipelines and entry points. In some embodiments, there can be fewer or greater than two parallel pipelines per entry point, and in other embodiments, there can be more or less than two entry points.

Ingestion pipelines 204, 210, 214, and 216 can process and prepare the live streams for delivery to the content distribution network 108. A transcoding component 218 is included in the ingestion pipelines 204, 210, 214, and 216, as well as other processing modules such as segmentation identification components 218, buffering components (not shown), and transcoding segments can be included. The pipelines 204, 210, 214, and 216 can also include a delay component 222 that can insert a delay that can be adjustable into the live media stream. The ingestion pipelines can also include packager and/or encryption components to package the stream into a container format and/or encrypt it.

The segmentation identification components 218 in pipelines 204, 210, 214, and 216 can identify segment boundaries in the ingested input stream and a segment component segments the input stream based on the segment boundaries. A live chunk manager that is associated with the pipeline that is selected for each buffered segment outputs the segment to the next step in the origin infrastructure 106 for indexing and storage before delivery to the content distribution network 108. This arrangement of parallel ingestion pipelines scales robustness of the system at all layers, from ingestion of the source material to encoding, storage, conversion into on-demand assets, publishing, and streaming.

Further to this regard, redundant transcoder components 222 of respective ingestion pipelines are provided within in order to support multiple resolutions and bitrates, which results in multiple live transcoder components 222 operating in parallel. The transcoder components of the transcoder components 222 operate in alignment at regular intervals when publishing streams, which ensures switching between streams, either to adapt bitrates or due to the failure of any on particular pipeline.

In order to ensure seamless joining of streams at different arbitrary points in time, the system 200 generates equivalent segments regardless of where any two or more streams join the process. In other words, regardless of where any one individual transcoder component 222 reads an input stream, it will ignore the input bytes until the transcoder component 222 detects a consistent chunk or segmented interval according to a consistent chunking rule, further discussed below.

Figure 3:
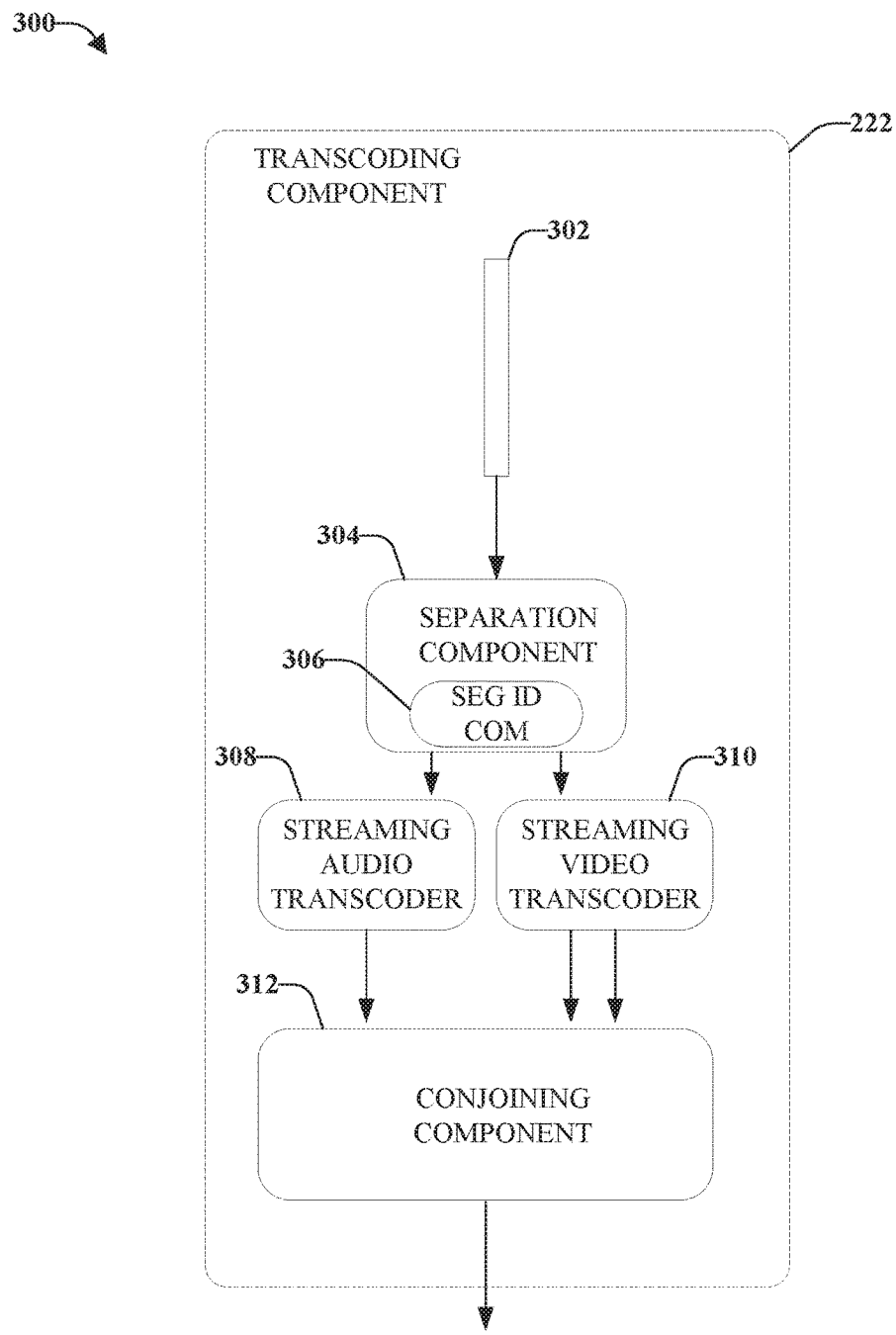
FIG. 3 is a block diagram illustrating an example, non-limiting embodiment of a system that can segment and transcode streams in accordance with various aspects and implementations described herein.

Turning now to FIG. 3, illustrated is a block diagram of a system 300 having the transcoding component 222 that splits a video stream into chunks and transcodes the chunks in parallel (e.g., MPEG-2 Transport Stream video stream chunks). The chunks, for example, are equivalent chunks that are generated as equivalent segments regardless of where the streams join or times in which the streams are read by the transcoder components of respective processing pipelines. [0035] The transcoder component 222 includes a separation component 304 that separates an input stream 302 into audio and video streams (e.g., demultiplexer, or like component). Audio streams are transmitted to a streaming audio transcoder 308 that transcodes the audio streams from one or more formats to another. The video streams are transmitted to a streaming video transcoder 310 that transcodes video streams in parallel or at substantially the same time to one another, including redundant video streams and/or different video streams. For example, the transcoder component 222 transcodes the video streams in parallel utilizing equivalent chunks or equivalent segments of the video streams. The chunks are transcoded in parallel along a plurality of transcoding pipelines, which can comprise various transcoder slaves operationally connected to the streaming video transcoder 310.

The transcoding component 222 includes a segment identification component 306 that can be housed within an ingestion pipeline, within the transcoding component 222, or elsewhere. The segment identification component 306 identifies segment boundaries within an interval of input streams for the plurality of transcoding pipelines that transcode the video stream portions. The segment identification component 306 can include an attribute or labeling component that attributes or labels metadata to the input streams that includes timestamps of equivalent chunk data. For example, a start time and an end time of the video stream can be preserved by being attached (e.g., tagged) to the equivalent chunks. Alternatively, the original timestamp data can be preserved by generating an equivalent chunk metadata stream that corresponds to the stream of identified equivalent video stream chunks.

The transcoding component 222 includes a conjoining component 312 that generates a transcoded stream (e.g., HTTP Live Streaming (HLS) MPEGTS/H264/AAC) segments, or any similar segmented live adaptive stream. The conjoining component 312 combines the input streams so that the audio and video stream from the plurality of transcoding pipelines are joined into a single stream having the equivalent chunks or segments of streaming data.

In order to enable the system 300 to operationally transcode parallel video streams and be adaptable to various bitrates, the transcoding component 222 operates to create equivalent chunks of video streams at consistent intervals via the segment identification component 306, which further labels these intervals consistently for a same length or duration. For example, the segment identification component 306 finds chunkable boundaries (time intervals for stream segments), which can correspond, for example, to an IDR frame for H.264 inputs. To obtain consistency, a bit-masking/modulo N stream joining and chunking of the input stream is employed, where N is the target length for a chunk/segment, in which the length could be a specified time or duration length. For example, if the timestamps for video packets are $t_1, t_2, t_3, \ldots$, then a consistent chunkable boundary can be the first chunkable boundary after $(t_k \mathbin{/} N)!=(t_{k-1}/N)$, where '/' denotes integer division.

For consistency, various rules can be employed by the transcoder component 222 to transcode equivalent chunks or segment of video streams of different transcoding qualities. For example, all audio and/or video packets are discarded until a chunkable boundary or identified boundary is recognized, which enables streams to be joined within the transcoding process seamlessly according to boundaries identified. Additionally, streams are chunked according to consistent boundaries. In other words, the streams are segmented into equivalent chunks consistently.

Figure 4:
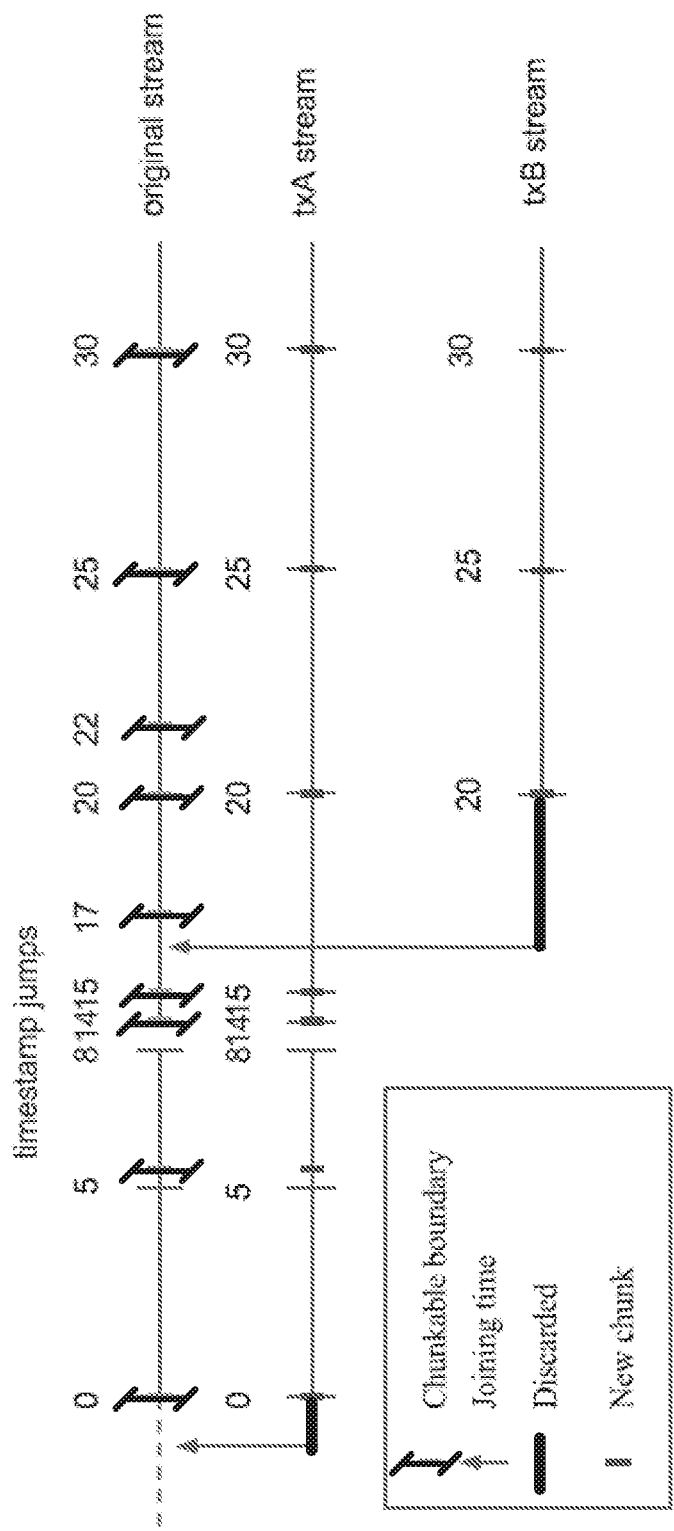
FIG. 4 is a chronological diagram illustrating an example, non-limiting embodiment of various transcoding streams processed in accordance with various aspects and implementations described herein.

FIG. 4 illustrates an example of an original stream that includes timestamp jumps and two transcoding streams joining the original stream at different times. Without consistent ways of chunking and labeling the chunks with timestamp attributes, publishing components, for example, are limited in being able to align different streams received, which is complicated by high quality input streams such as MPEG 2 Transport streams (M2TS) having timestamp jumps and resets. Consequently, the transcoder components do not necessarily contain timestamps corresponding to the original timestamps of the input streams.

A timestamp in FIG. 4, for example, is illustrated between time 8 and 14 of the original stream, below the label "timestamp jumps." Because the original stream has chunkable boundaries (identified segments boundaries), redundant or other transcoding streams in parallel can be joined at any time seamlessly and different bitrates streams can be adaptable in the process. As illustrated, transcoding stream txA and transcoding stream txB are joined with an original stream at different times as designated by the arrow points. Portions of the respective streams that are not consistently equivalent chunks are discarded or disregarded.

Figure 5:
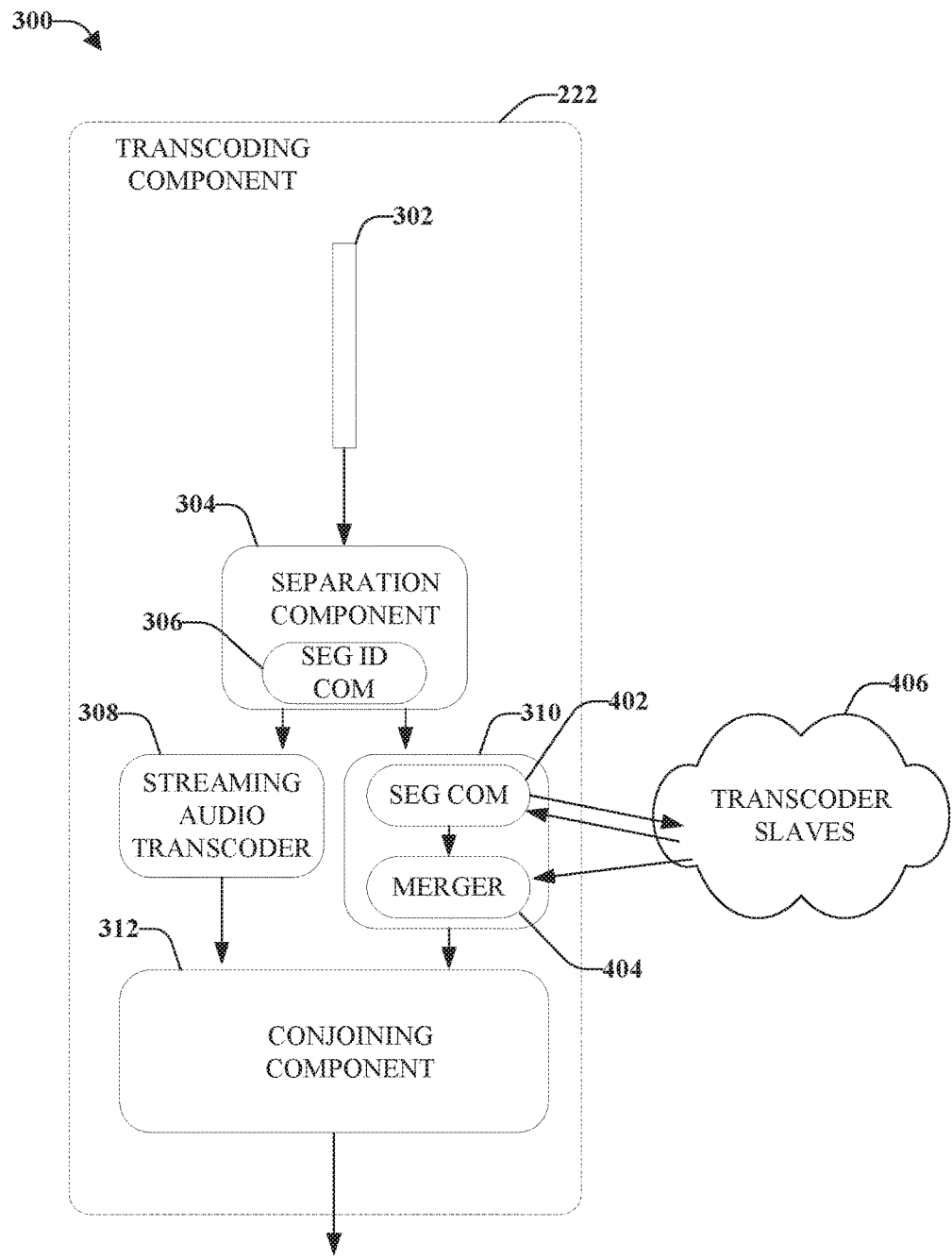
FIG. 5 is a block diagram illustrating an example, non-limiting embodiment of a system that can transcode input stream in accordance with various aspects and implementations described herein.

Referring to FIG. 5, illustrated is an exemplary embodiment of a transcoding component that splits a video stream into chunks, transcodes the chunks in parallel and can merge the transcoded video chunks. The stream video transcoding component 222 operates as a live transcoding system that divides the video streams into chunks and based on the available transcoder slave slots, operates to provide an adjustable delay for a target transcoding, such as with the delay component 220 (discussed above).

After a video is recorded and provided as input to the transcoding component 222, for example, the segment identification component 306 identifies chunkable boundaries or, in other words, segment boundaries within an interval of the input streams for a plurality of transcoding pipelines. The video streaming transcoder component 310 receives the identified boundaries in the video streams, which are processed in parallel (substantially the same time) with the audio stream in the streaming audio transcoder 308. The video streaming transcoder component 310 allocates transcoding streams to transcoder slave slot 406 for parallel processing, in which failures and adaptive streaming can join the streams to the original stream being processed at the segment component 402 (e.g., a chunk splitter). The merger component 404 merges the transcoded video streams and forwards them to the conjoining component 312, where the audio and video streams are combined into a single stream with segments according to the segment boundaries of the chunks to generate the equivalent segments in a pipeline.

Figure 6:
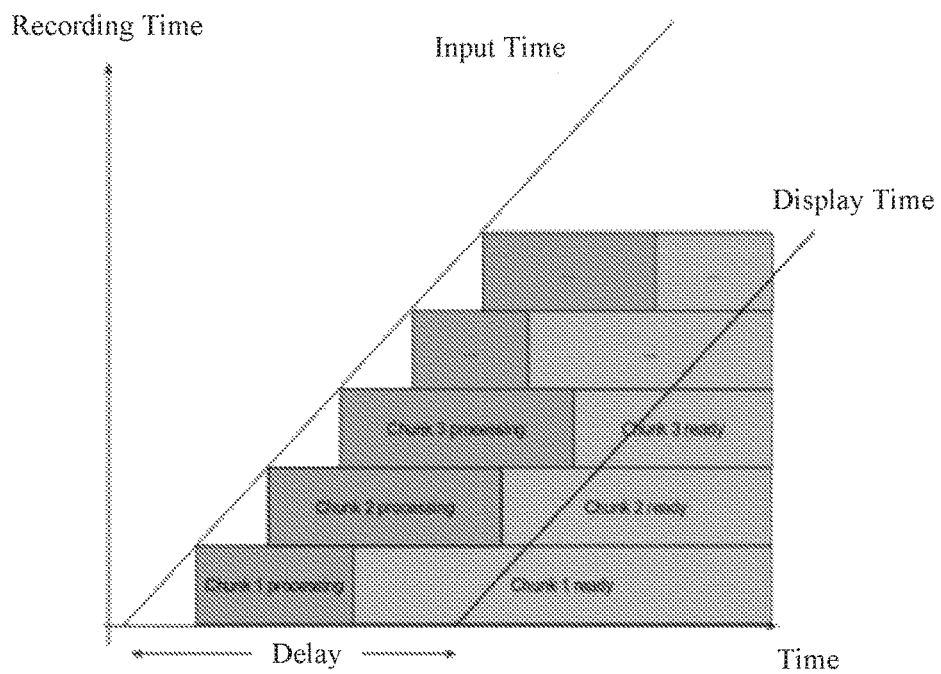
FIG. 6 is a diagram illustrating an example, non-limiting embodiment for processing transcoding streams in accordance with various aspects and implementations described herein.

FIG. 6 illustrates processing times of chunks according to input times and display time. A delay is shown between a time a video is recorded and a display time so that after recording a video is provided as input to a transcoder, when there is enough data, a chunk begins processing. The display time thus corresponds to a worst case processing time of a chunk plus some addition factor to account for uncertainty, merging/multiplexing overhead, and other delays within the system. In one embodiment, a delay can be adjustable for different input streams having different transcoding qualities (bitrates, formats, etc.). The delay, for example, is adaptive according to a latency of processing within the transcoding pipelines.

Figure 7:
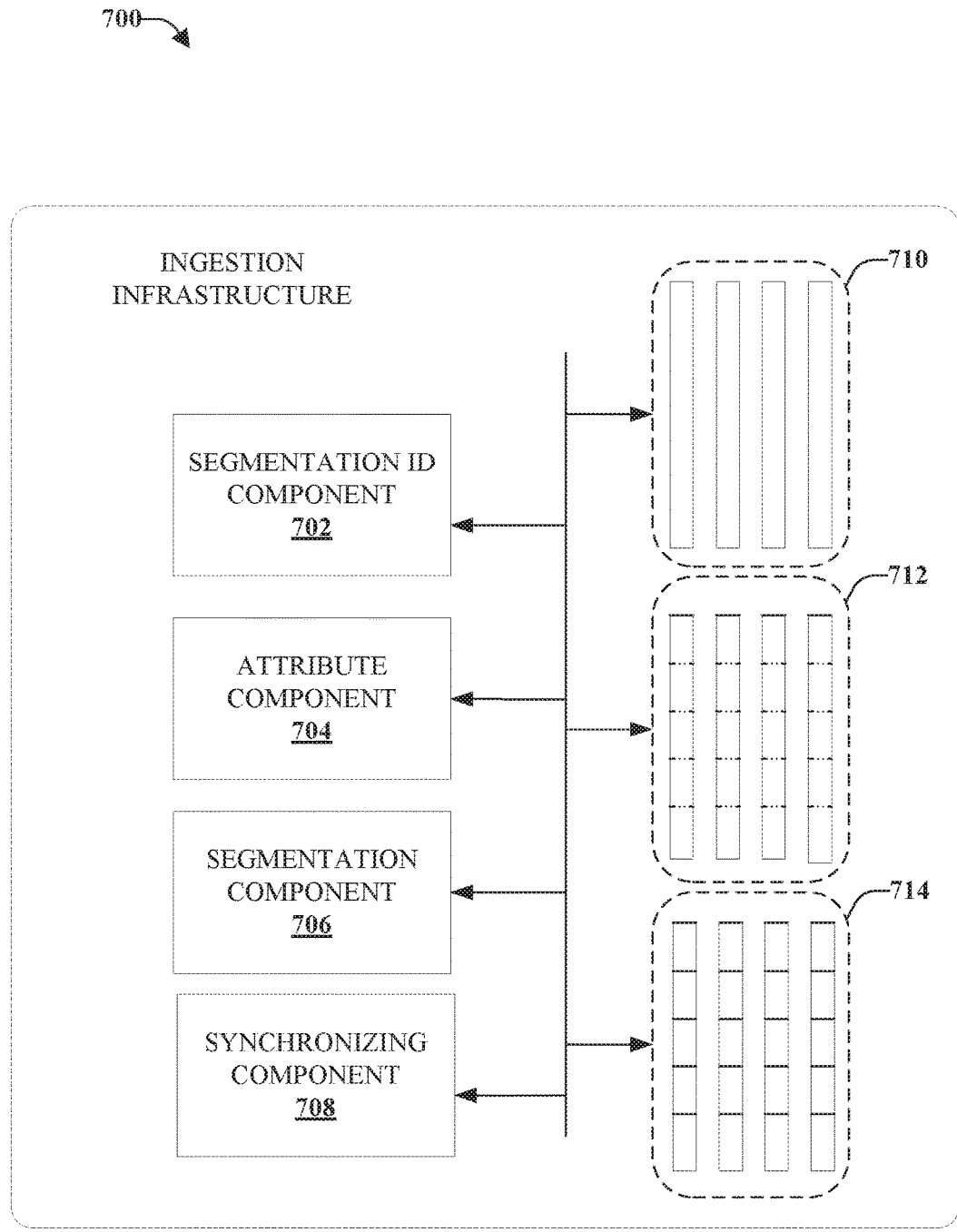
FIG. 7 illustrates a block diagram of an example, non-limiting embodiment of a system for selecting, segmenting, labeling and synchronizing input streams in accordance with various aspects and implementations described herein.

Referring now to FIG. 7, illustrated is a system that generates equivalent chunks with metadata in accordance with various aspects and implementations is illustrated. System 700 can include part of ingestion infrastructure 104 with segment identification component 702, an attribute or labeling component 704, a segmentation component 706 and a synchronizing component 708. Parallel ingestion pipelines with live media streams are shown at different stages of processing at 710, 712, and 714. It is to be appreciated that while FIG. 7 shows one segmentation component 702, one attribute component 704, one segmentation component 706, and one synchronizing component 708 in the ingestion infrastructure 104, this is done for simplicity, and each of the parallel ingestion pipelines can include these components.

Segmentation identification component 702 can identify segment boundaries in an ingested input stream and then segmentation component 706 segments the input stream based on the segment (chunkable) boundaries. The segment identification component 702 and segmentation component 706 can segment each of the parallel ingested input streams in each of the pipelines as well, or alternatively separate components can identify and segment the separate input streams.

Segment identification component 702 receives the un-segmented input stream 708 and identifies segments in the input stream In some embodiments, segment boundaries identified can be based on the number of frames (i.e. start a new segment every n frames). Alternatively, in other embodiments, segment boundaries can be based on the types of frames (i.e. start a new segment every intra frame or inter frame). Other segmentation functions can identify segment boundaries based on a bitmasking/modulo N stream joining and chunking of the input stream, where N is the target length for a chunk/segment, in which the length could be a specified time or duration length. For example, if the timestamps for video packets are $t_1, t_2, t_3, \ldots$, then a consistent chunkable boundary can be the first chunkable boundary after $(t_k/N)!=(t_{k-1}/N)$, where '/' denotes integer division.

In an aspect of the disclosure, to maintain parallelism of the input streams, the algorithm or function that segment identification component 702 uses to identify segment boundaries can be stable over each of the input streams so that the segments boundaries identified and segmented are the same for each of the input streams. To accomplish this, in some embodiments, the segmentation identification component 702 and/or each of the individual segmentation components can start looking for segment boundaries at a common key frame. In other embodiments, segment identification component 702 and/or the segmentation component 706 can start at the beginning of a stream.

In another embodiment, the segment identification component 702 and/or the segment component 706 can use an algorithm that is robust to stream discontinuities. Therefore, in the event of a failure or discontinuity of an input stream, the parallelism of the segmenting of the input streams will not be interrupted.

Once segment identification component 702 identifies the segments, the input stream 712 can be segmented, and the segmented input streams 714 are the result of the segmenting. There can be one segment in each of the input streams per time period. The time period can be based on the length of the segment or the length of the segment can be based on the length of the time period.

The attribute component 704 operates to attribute metadata to the input stream 708 in order to preserve attributes, such as original timestamp data of equivalent chunks. For example, the attribute component 704 attaches or tags original starting and ending timestamps to each equivalent chunk that is identified or segmented. In one embodiment, the attribute component 704 operates in conjunction with the segmentation identification component 702 and segmentation component 706 at anywhere in the processing pipeline and in different configurations in order to have segments grouped with data/metadata streams. Therefore, further processing components downstream can read equivalent segments of video data along with metadata corresponding thereto.

Additionally, the synchronizing component 708 is operable to synchronize input streams having different formats that are processed within different transcoding pipelines of the plurality of transcoding pipelines. For example, the synchronizing component 708 synchronizes the input streams based on metadata attributed to the input streams. The streams, for example, can be video streams transcoded in parallel in a video stream transcoder, as discussed above, or transcoded streams from different ingestion pipelines, for example.

Figure 8:
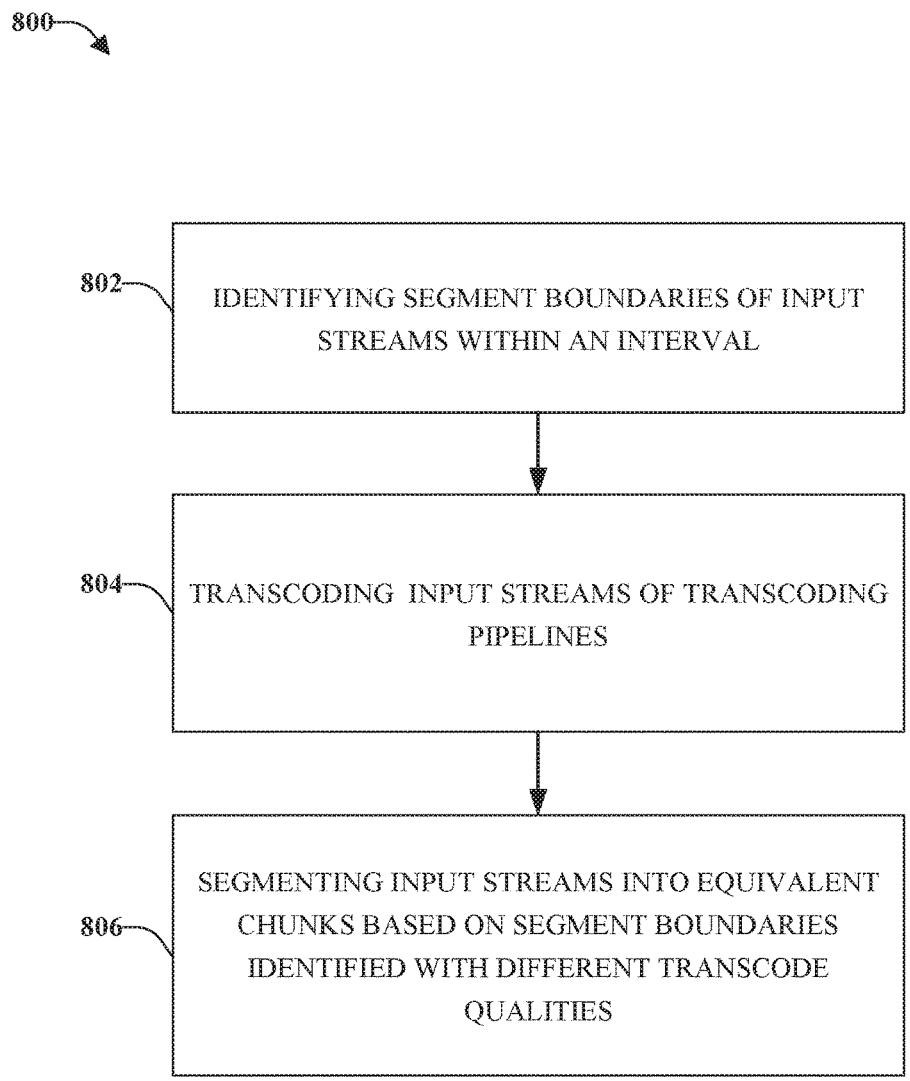
FIG. 8 illustrates a flow diagram of an example, non-limiting embodiment for identifying, transcoding and segmenting input streams in accordance with various aspects and implementations described herein.

FIG. 8 illustrates an exemplary flow diagram 800 of an example non-limiting embodiment of a methodology for segmenting input streams and selecting segments according to an aspect of the present disclosure. For simplicity of explanation, the method is depicted and described as a series of acts. However, acts in accordance with this disclosure can occur in various orders and/or concurrently, and with other acts, either described or not herein. Furthermore, not all illustrated acts may be required to implement the method in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media (e.g., non-transitory storage media).

Moreover, various acts have been described in detail above in connection with respective system diagrams. It is to be appreciated that the detailed description of such acts in FIG. 1-7 can be and are intended to be implementable as methods and/or in accordance with the following depicted method.

At 802, segment boundaries in an ingested input stream are identified (e.g. by segment identification component) in order for the same lengths to be segmented into equivalent chunks. Segment boundaries of a plurality of input streams can be identified. Segment boundaries can be identified based on the number of frames (i.e. start a new segment every n frames). Alternatively, in other embodiments, segment boundaries can be based on the types of frames (i.e. start a new segment every intra frame or inter frame). To ensure that the input streams are processed in parallel, the algorithm or function that is used to identify segment boundaries should be stable over each of the input streams so that the segments boundaries identified and segmented are the same for each of the input streams. To accomplish this, in some aspects of the disclosure, the segmenting and identifying processes can initiate at a common key frame across all of the input streams. Alternatively, the identifying can be initiated from the beginning of the stream At 804, the input streams identified with boundaries are transcoded in a plurality of transcoding pipelines. For example, redundant parallel transcoding pipelines transcode copies or different streams having different transcode qualities, such as different bitrates, different timestamps, different start times, end times, formats, etc. Therefore, each redundant stream is able to be merged with consistent chunks of data that are equivalent in length or duration.

Once the segment boundaries are identified, the streams can be segmented based on the boundaries at 806. There can be one segment in each of the input streams per time period. The time period can be based on the length of the segment or the length of the segment can be based on the length of the time period. Each of the segments per a time period can be interchangeable such that a reconstructed master stream can be composed of any of the segments in the input streams per a time period.

In one example, of the method 800 a transcoding component can generate equivalent segments regardless of where different streams are joined. For example, a first transcoding pipeline stream (e.g., txA) that has a high quality format (e.g., M2TS) can join at time stamp 24 and have generated segments with the following start and end times: (26-30), (30-35), (35-40), (40-46), (46-50) . . . .

Further, a different or second transcoding pipeline stream (e.g., txB) having a different or same quality format could join the processed streams at timestamp 33 and no different in the input stream will be observed from the input stream of txA. Segments will be generated as follows: (35-40), (40-46) . . . . Regardless of where an individual transcoder component starts reading an input stream, the transcoder components will neglect or ignore the input bytes until is discovers a consistent chunkable interval defined by boundaries identified, as discussed above. These chunks are then transcoded in parallel to ensure high-quality transcoding, with original timestamps preserved in metadata.

Exemplary Computing Device

Figure 9:
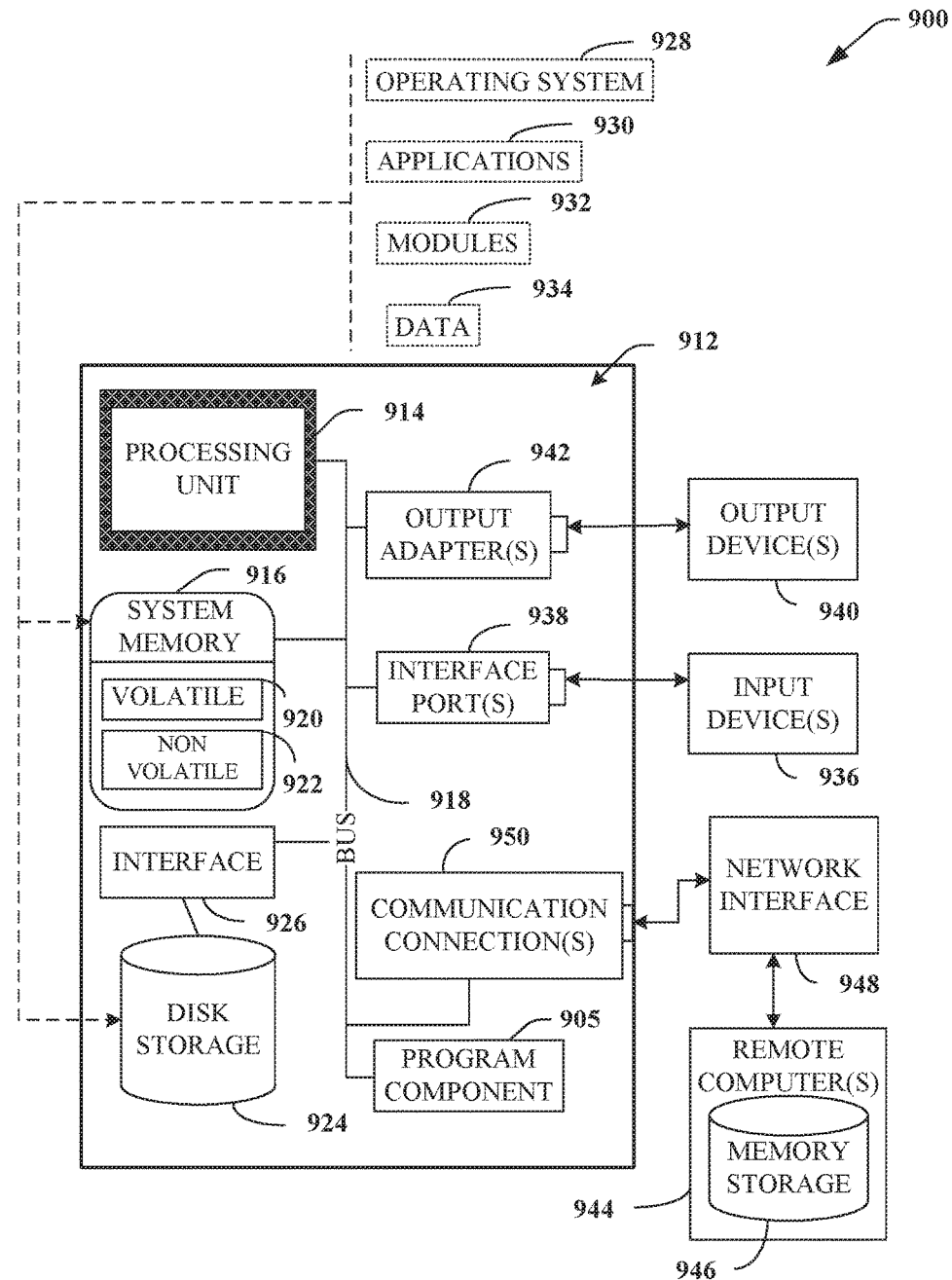
FIG. 9 is a block diagram illustrating an example computing device that is arranged in accordance with various aspects and implementations described herein.

With reference to FIG. 9, a suitable environment 900 for implementing various aspects of this disclosure includes a computing device 912. It is to be appreciated that the computer 912 can be used in connection with implementing one or more of the systems or component shown and described in connection with FIGS. 1-7. The computing device 912 includes a processing unit(s) 914, a system memory 916, and a system bus 918.

The system bus 918 couples system components including, but not limited to, the system memory 916 to the processing unit 914. The processing unit(s) 914 can be any of various available processors. Dual microprocessors and other multiprocessor architectures also can be employed as the processing unit(s) 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 994), and Small Computer Systems Interface (SCSI).

The term "computer readable media" as used herein includes computer readable storage media and communication media. Computer readable storage media includes volatile and nonvolatile, removable and non-removable media implemented in any method or technology for storage of information such as computer readable instructions or other data. The system memory 916 includes volatile memory 920 and nonvolatile memory 922. The basic input/output system (BIOS), containing the basic routines to transfer information between elements within the computing device 912, such as during start-up, is stored in nonvolatile memory 922. By way of illustration, and not limitation, nonvolatile memory (e.g., 922) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 920) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 912 can also include removable/non-removable, volatile/non-volatile computer storage media. FIG. 9 illustrates, for example, a disk storage 924. Disk storage 924 includes, but is not limited to, devices like a magnetic disk drive, flash drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computing device 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computing device 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computing device 912, and to output information from computing device 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computing device 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computing device 912. For purposes of brevity, only a memory storage device 946 is illustrated with remote computer(s) 944. Remote computer(s) 944 is logically connected to computing device 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computing device 912, it can also be external to computing device 912. The hardware/software necessary for connection to the network interface 948 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 912 can be used segment redundant input streams and select a master segment from among the input streams per a time period. Computing device 912 can also transcode an input stream into output streams with varying bitrates and/or container formats. As more fully disclosed herein, in some implementations, the computing device 912 can include one or more processors (e.g., 914) that can be used to process data, including processing data to perform various tasks (e.g., identifying segment boundaries, segmenting the input streams based on the segment boundaries, buffering segments and indexing and storing the buffered segments in memory, and selecting a master buffered segment per a time period from among the buffered segments, etc.). The computing device 912 can include a program component 905 that can be associated with (e.g., communicatively connected to) the one or more processors. The program component 905 can contain, for example, a segmentation component, a buffer component, a master selection component, and a transcoding component, and/or other components, which can respectively function as more fully disclosed herein, to facilitate embodiments of the disclosure described herein.

Exemplary Networked and Distributed Environments

Figure 10:
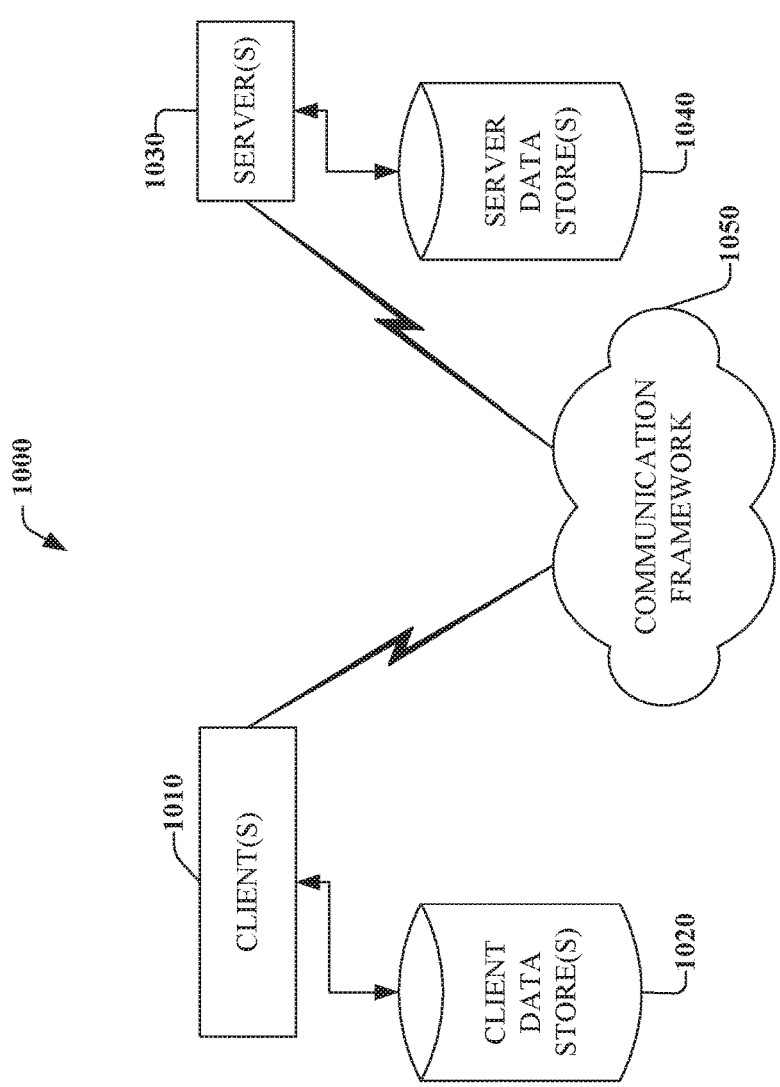
FIG. 10 is a block diagram illustrating an example networking environment in accordance with various aspects and implementations of this disclosure.

FIG. 10 is a schematic block diagram of a sample-computing environment 1000 in accordance with implementations of this disclosure. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable storage medium/media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system. In the cloud computing system, computing can be delivered as a service, rather than a product. Thus, resources, software, and information can be shared between computers and servers over a network.

End-users access cloud-based applications through a web browser, or other light weight desktop or mobile app while the business software and data are stored on servers at remote locations.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with softwaremultithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method comprising:
   separating, using a separation component, a plurality of input streams into a plurality of audio streams having different bitrates and a plurality of video streams having different bitrates;
   transcoding, using an audio transcoder, the plurality of audio streams into a plurality of transcoded audio streams having different transcode qualities;
   transcoding, using a video transcoder, the plurality of video streams into a plurality of transcoded video streams having different transcode qualities;
   segmenting, using a segmentation component, the plurality of audio streams into a plurality of equivalent audio segments based on identified segment boundaries associated with the plurality transcoded audio streams and the plurality of video streams into a plurality of equivalent video segments based on identified segment boundaries associated with the plurality of transcoded video streams; and
   joining, using a conjoining component, the plurality of equivalent audio segments and the plurality of video segments into a single stream.

2. The method of claim 1, further comprising transcoding, using the audio transcoder, the plurality of audio streams in parallel with a delay for each audio stream and transcoding, using the video transcoder, the plurality of video streams in parallel with a delay for each video stream.

3. The method of claim 2, further comprising adjusting, using the audio transcoder, the delay for transcoding the plurality of audio streams for different audio streams and adjusting using the video transcoder, the delay for transcoding the plurality of video streams for different video streams.

4. The method of claim 2, wherein the delay for transcoding the plurality of audio streams and the delay for transcoding the plurality of video streams are adaptive according to a latency of processing in respective input streams of the plurality of input streams.

5. The method of claim 1, further comprising attributing, using an attribute component, metadata to the plurality of input streams that preserves attributes of an input stream respectively, the attributes including original timestamps of the equivalent audio segments and the equivalent video segments respectively.

6. The method of claim 5, further comprising attaching, using the attribute component, original starting and ending timestamps to each of the equivalent audio segments and each of the equivalent video segments.

7. The method of claim 1, wherein the identified segment boundaries indicate starts of each audio segment and video segment.

8. A system comprising:
a processor for executing instructions; and
a non-transitory computer readable medium storing instructions executable to perform steps comprising:
separating a plurality of input streams into a plurality of audio streams having different bitrates and a plurality of video streams having different bitrates;
transcoding the plurality of audio streams into a plurality of transcoded audio streams having different transcode qualities;
transcoding the plurality of video streams into a plurality of transcoded video streams having different transcode qualities;
segmenting the plurality of audio streams into a plurality of equivalent audio segments based on identified segment boundaries associated with the plurality transcoded audio streams and the plurality of video streams into a plurality of equivalent video segments based on identified segment boundaries associated with the plurality of transcoded video streams; and
joining the plurality of equivalent audio segments and the plurality of video segments into a single stream.

9. The system of claim 8, wherein the non-transitory computer readable medium stores instructions executable to perform steps further comprising transcoding the plurality of audio streams in parallel with a delay for each audio stream and transcoding the plurality of video streams in parallel with a delay for each video stream.

10. The system of claim 9, wherein the non-transitory computer readable medium stores instructions executable to perform steps further comprising adjusting the delay for transcoding the plurality of audio streams for different audio streams and adjusting the delay for transcoding the plurality of video streams for different video streams.

11. The system of claim 9, wherein the delay for transcoding the plurality of audio streams and the delay for transcoding the plurality of video streams are adaptive according to a latency of processing in respective input streams of the plurality of input streams.

12. The system of claim 8, wherein the non-transitory computer readable medium stores instructions executable to perform steps further comprising attributing metadata to the plurality of input streams that preserves attributes of an input stream respectively, the attributes including original timestamps of the equivalent audio segments and the equivalent video segments respectively.

13. The system of claim 12, wherein the non-transitory computer readable medium stores instructions executable to perform steps further comprising attaching original starting and ending timestamps to each of the equivalent audio segments and each of the equivalent video segments.

14. The system of claim 8, wherein the identified segment boundaries indicate starts of each audio segment and video segment.

15. A non-transitory computer readable storage medium comprising computer executable instructions that, in response to execution, cause a processor to perform operations comprising:
identifying a plurality of segment boundaries within an interval of input streams of a plurality of input streams;
separating the plurality of input streams into a plurality of audio streams having different bitrates and a plurality of video streams having different bitrates;
transcoding the plurality of audio streams into a plurality of transcoded audio streams having different transcode qualities;
transcoding the plurality of video streams into a plurality of transcoded video streams having different transcode qualities;
segmenting the plurality of audio streams into a plurality of equivalent audio segments based on identified segment boundaries associated with the plurality transcoded audio streams and the plurality of video streams into a plurality of equivalent video segments based on identified segment boundaries associated with the plurality of transcoded video streams; and
joining the plurality of equivalent audio segments and the plurality of video segments into a single stream.

16. The computer readable storage medium of claim 15, further comprising transcoding the plurality of audio streams in parallel with a delay for each audio stream and transcoding the plurality of video streams in parallel with a delay for each video stream.

17. The computer readable storage medium of claim 16, further comprising adjusting the delay for transcoding the plurality of audio streams for different audio streams and adjusting the delay for transcoding the plurality of video streams for different video streams.

18. The computer readable storage medium of claim 16, wherein the delay for transcoding the plurality of audio streams and the delay for transcoding the plurality of video streams are adaptive according to a latency of processing in respective input streams of the plurality of input streams.

19. The computer readable storage medium of claim 15, further comprising attributing metadata to the plurality of input streams that preserves attributes of an input stream respectively, the attributes including original timestamps of the equivalent audio segments and the equivalent video segments respectively.

20. The computer readable storage medium of claim 19, further comprising attaching original starting and ending timestamps to each of the equivalent audio segments and each of the equivalent video segments.

* * * * *